Dec. 16, 1947.    J. C. OGLE, JR., ET AL    2,432,538
METHOD OF COATING SURFACES WITH QUARTZ
Filed Sept. 15, 1945    2 Sheets-Sheet 1
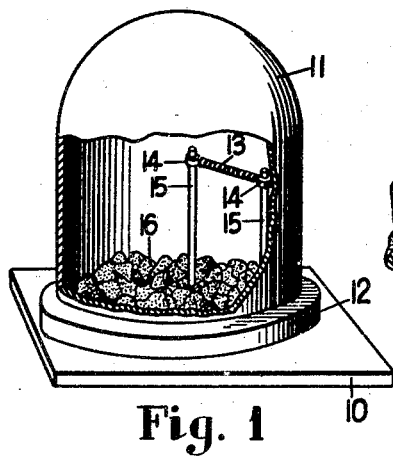
Fig. 1
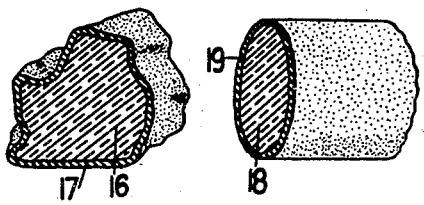
Fig. 2    Fig. 3
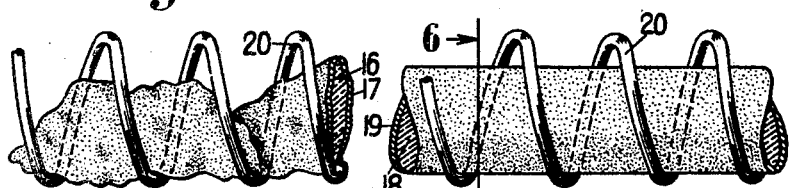
Fig. 4    Fig. 5
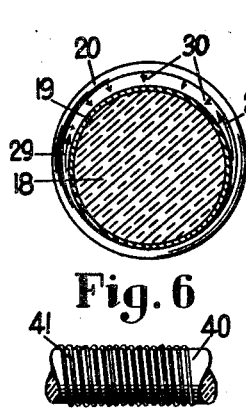
Fig. 6
Fig. 7
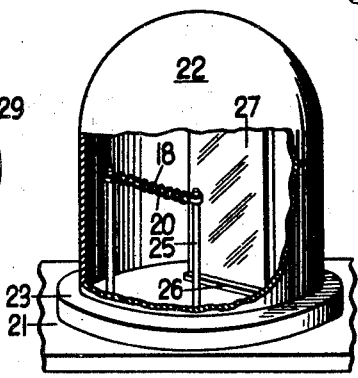
Fig. 8
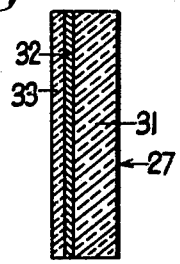
Fig. 9
INVENTORS
James C. Ogle, Jr.
Arthur R. Weinrich.
BY
Corbett, Mahoney & Miller
ATTORNEYS Dec. 16, 1947.    J. C. OGLE, JR., ET AL    2,432,538
METHOD OF COATING SURFACES WITH QUARTZ
Filed Sept. 15, 1945    2 Sheets-Sheet 2

INVENTORS
James C. Ogle. Jr.
BY    Arthur R. Weinrich.
Corbett, Mahoney & Miller
ATTORNEYS Patented Dec. 16, 1947

2,432,538

UNITED STATES PATENT OFFICE 2,432,538

METHOD OF COATING SURFACES WITH QUARTZ

James C. Ogle, Jr., and Arthur R. Weinrich, Brackenridge, Pa., assignors to Libbey-Owens-Ford Glass Company, Toledo, Ohio, a corporation of Ohio Application September 15, 1945, Serial No. 616,500

5 Claims. (Cl. 117—106)

1

The present invention relates to a method of coating a surface with quartz. It has to do more particularly with the precoating of quartz with a suitable metal or metals to permit the control and uniformity of the thermal evaporation of the quartz to produce, by deposition, a relatively thick and uniform protective coating, covering or layer on the surface or face of an article of manufacture, such as glass, plastic, mirrors or reflectors, or other articles. It also has to do with the improved article so produced. The present application is a continuation-in-part of our copending application Serial Number 512,388, which issued as Patent No. 2,386,876 on October 16, 1945.

Since quartz is highly transparent, it provides a most desirable and satisfactory coating or protective covering for the surface of a mirror or reflector, lends permanency to the reflective surface, and prevents scratching or marring of said surface due to its extremely hard character.

Previous attempts have been made to evaporate quartz and apply it by deposition to a reflective surface, but due to the fact that quartz alone is extremely difficult to evaporate, such attempts have been largely unsuccessful and unsatisfactory. Quartz must be heated to a white heat in order to bring about evaporation even in a high vacuum. It is well known that quartz will not absorb heat by radiation and previous attempts to cause it to cling to or wet a thermal heat-emitting filament by capillary attraction have failed. Thus, attempts to produce a surface coating of quartz alone by the heating techniques employed in thermal evaporation have generally met with failure.

It is, therefore, one of the objects of our present invention to provide means or a method or process of evaporating quartz to apply, by deposition, resulting from thermal evaporation, a protective surface coating or covering of quartz on a previously prepared glass, plastic or reflective surface, such as the surface or face of a mirror in which the mirrored surface has been produced by known methods and by the use of metals suitable for this purpose.

Another object of our invention is to provide means or a method whereby the previously uncertain control of the evaporation of quartz is entirely overcome and to provide for the evaporation of relatively large quantities of quartz to produce uniform relatively thick and extremely hard surface coatings on other articles.

Another object of the present invention is to provide means or a method to facilitate the uniform evaporation of quartz by precoating the quartz, in any suitable manner, with a metal or metals, such as beryllium, titanium, or zinc, which serves to promote or effect the evaporation of the quartz.

A further object of our invention is to provide means or a method of evaporating quartz, in which the quartz has applied thereto, by wrapping or winding around the surface thereof, a thin wire formed from beryllium, titanium, or zinc to effect the evaporation of the quartz by normal evaporation technique.

Another object is to provide an improved article of manufacture, such as a mirror or reflector, having a relatively thick protective coating over the reflective surface thereof.

Generally speaking, our improved means or method of evaporating quartz comprises the steps of preferably precoating the quartz with any one of the several suitable metals referred to above, applying the thus coated quartz to an electric coil, such as a tungsten filament, placed in a high vacuum, energizing the coil or filament to heat the same and cause, in effect, a wetting of the filament by the quartz during which the quartz undergoes a superficial molten phase, and thereafter maintaining a high temperature in the electric coil or filament with the coated quartz in actual physical contact with the filament whereby to controllably heat the entire mass of quartz to a very high temperature and to effect the deposition, by uniform thermal evaporation from all surfaces of the quartz, of a uniform and controlled surface coating, layer, or protective covering of the particles or molecules of the quartz to the surface or face of an article, such as the reflective surface of a previously silvered mirror.

The foregoing and other objects and advantages of our invention will appear from the following description and appended claims when considered in connection with the accompanying drawings forming a part of this specification wherein like reference characters designate corresponding parts in the several views.

In said drawings:

Figure 1 is a perspective view, partly broken away, illustrating a suitable apparatus for precoating quartz in accordance with the present invention.

Figure 2 is a fragmentary perspective view, partly in section, showing a piece of precoated quartz of irregular contour, in accordance with the present invention.

Figure 3 is a fragmentary perspective view, partly in section, showing a precoated round bar or rod of quartz in accordance with our invention.

Figure 4 is an elevational view of a portion of an electric coil or filament shown supporting several irregular pieces of precoated quartz in accordance with the present invention.

Figure 5 is a view similar to Figure 4 and showing a strip, such as a round bar or rod, of precoated quartz supported by an electric coil or filament.

Figure 6 is an enlarged vertical sectional view taken substantially along the line 6—6 of Figure 5, looking in the direction of the arrows.

Figure 7 is a fragmentary elevational view of a round bar or rod of plain quartz having a wrapping or winding of metallic wire applied to the surface thereof.

Figure 8 is a perspective view, partly broken away, of a suitable apparatus for performing the technique of evaporation of the quartz and effecting its deposition upon the reflective surface or face of an article, such as a mirror.

Figure 9 is an edge view of a mirror or reflector having a surface protective coating or layer of quartz produced in accordance with the present invention.

Figure 10:
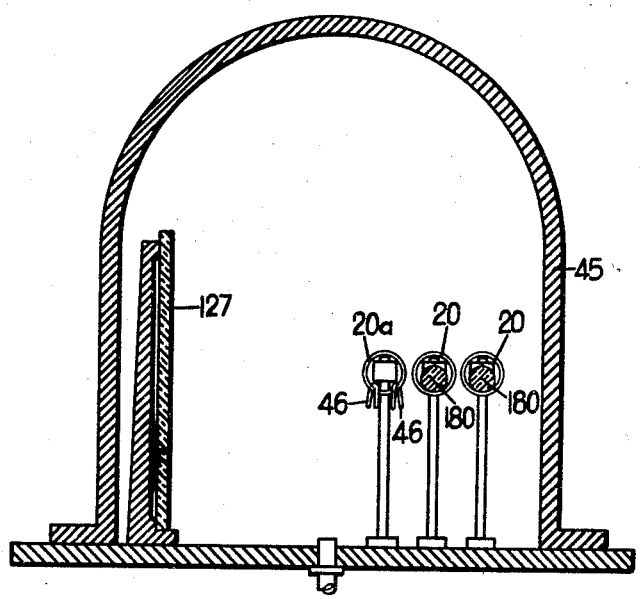
Figure 10 is a vertical sectional view of an apparatus embodying the invention wherein several electrically heated resistance coils are provided.

Before explaining in detail the present invention it is to be understood that the invention is not limited in its application to the details of construction and arrangement of parts illustrated in the accompanying drawings, since the invention is capable of other embodiments and of being practiced and carried out in various ways. It is to be understood also that the phraseology and terminology employed herein is for the purpose of description and not of limitation, and it is not intended to limit the invention herein claimed beyond the requirements of the prior art.

Referring now particularly to Figure 1 of the drawings, there is shown a suitable apparatus for applying a metal coating to pieces of quartz. The apparatus, as shown, comprises a supporting base 10 upon which is mounted a housing, such as a bell jar 11 whose bottom portion is provided with a surrounding outward projection or flange 12 adapted to rest upon the top surface of the supporting base 10. Located within the chamber provided by the housing 11, is an electrically energized heating coil or filament 13, having its opposite ends connected to suitable supporting members or brackets 14 which are mounted upon upright posts or supports 15. These posts are, as shown, mounted in the supporting base 10. A number of pieces of quartz 16 are placed upon the supporting base and within the chamber to receive a precoating of some suitable metal with which the coil or filament 13 has been provided and which metal is thermally evaporated and particles or molecules thereof dispersed by the coil onto the quartz pieces 16 to substantially coat or cover the surfaces thereof. We have found that certain metals may be used for this purpose, such, for example, as beryllium, titanium, or zinc. The chamber may be evacuated of air and vacuumized, to a high degree, by suitable means (not shown).

After the operation of precoating the quartz pieces has been completed, they may be removed from the chamber for future use. One typical precoated piece of quartz is shown at 16 in Figure 2, it being noted that the quartz piece 16 has a coating 17 of metal on its exterior surfaces. If desired, the quartz pieces placed within the coating chamber may be in the form of round bars or rods, a fragment of one such being shown at 18 in Figure 3, the bar having a metallic surface coating 19, as indicated in this figure.

The pieces of metal-coated quartz 16 or 18, as the case may be, are now in readiness to be applied to and supported by an electric coil or filament, such as the coil or filament 20, shown in enlarged detail in Figures 4, 5 and 6, and in operative position in suitable apparatus in Figure 8. In Figure 4 the filament is shown as supporting two irregular pieces 16 of coated quartz, whereas in Figure 5 the filament 20 is shown as supporting a round bar or rod 18 of precoated quartz.

Referring now to Figure 8 of the drawings there is shown in this figure a suitable apparatus for effecting the thermal evaporation of the metal-coated or covered quartz, such as the irregularly shaped pieces 16 or the bars 18. The apparatus of Figure 8 is, as shown, generally similar to that shown in Figure 1 and comprises a suitable supporting base 21, a housing 22 having a surrounding outward projection or flange 23 which rests upon the supporting base, the housing and base together providing a closed chamber. The electric coil or filament 20, shown in Figures 4, 5 and 6, is located within the housing and is supported in substantially horizontal position therein by having its opposite ends attached to supporting members or brackets 24 which are adjustably mounted upon upright posts or rods 25 carried by the base 21 of the apparatus.

The base 21 is also provided with a supporting member 26 for supporting a mirror or reflector, shown as a whole at 27, in upright position within the chamber, the mirror being located opposite the coil or filament 20. It is to be noted that a round bar or rod of metal-coated quartz, such as the rod 18 of Figure 5, is located in and supported by the coil 20. The chamber of the apparatus is now preferably evacuated of air and a high vacuum of the order of 10 to the minus 5 millimeters created therein by means of suitable apparatus (not shown) provided for this purpose. The electric coil or filament 20 is now energized and thus heated, whereupon the metal-coated quartz will tend to adhere to the filament and, in effect, wet or coat it since, during this preliminary heating, the metal-coated quartz develops a superficial molten phase. The heat from filament 20, with which the quartz piece 18 is in actual physical contact through the medium of the metal coating 19, is directly communicated to the quartz. As seen in Figure 6, the heat travels upwardly by conduction in the metal coating 19 in the direction of the arrows 29 to completely encircle the surface of the quartz. Uncoated quartz is a poor heat conductor. Radiant heat waves from those portions of the filament 20 with which the coated quartz is not actually in physical contact are radiated from the filament generally in the direction of the arrows 30 to the heat radiation absorbing metal coating 19 and thence by surface contact directly to the quartz. Uncoated quartz does not absorb radiant heat to any large degree and is hence difficult to heat. However, with our metal-coated quartz, all portions or surfaces of the quartz are subjected to the heat, preventing any jittering of the quartz, which occurred with all previously known methods where attempts were made to heat and thermally evaporate the quartz. By our improved method, the heating of the quartz is controlled and effectually accomplished.

Quartz must be heated to temperatures beyond 1500° C. to secure evaporation in a high vacuum. It is the inventors' belief that a mere heating of quartz in a tungsten electric resistance coil as in the past attempts to evaporate this material failed despite high heater wire temperatures by not actually heating any large part of the quartz to these high temperatures because of both the poor heat conductivity and poor radiant heat absorption by the quartz. Heating by convection currents is of course absent in a vacuum and the quartz which does not melt becomes heated only at the immediate point at which it contacts the tungsten wire. This wire may easily be above 3500° C. without the main body of the quartz being heated to a sufficiently high temperature, such as 1800° to 2000° C. to evaporate. The localization of the heating with ordinary quartz is shown by a peculiar phenomenon in that on close observation the quartz pieces are found not to remain at rest and in contact with the heater wires but to actually dance on the same. Thus the localized areas in contact with the heater wire are raised sufficiently in temperature to vaporize some quartz and the pressure of such vapor at this spot, which exists only on the heater-contacting side of the piece, is sufficient to lift the piece away from the wire. This breaks the thermal contact and the quartz piece immediately cools and stops evaporating and as the vapor pressure disappears the piece again falls onto the wire. Thus, the only means of getting heat into the clear non-radiant heat-absorbing quartz is by a localized thermal contact which is constantly broken. In the case of heating a rod of uncoated quartz, the quartz continuously bounds around inside the coil as it is blown away from contact and on hitting on the other side and making thermal contact it again bounces back off. It can be seen that as thermal conduction is poor in the quartz most of the surface of the quartz (and the inside of the particles) do not get sufficiently hot to become evaporating surfaces and hence there is no uniformity of evaporation in all directions into the apparatus, the evaporation secured being sporadic and undependable, and relatively small in quantity.

We have overcome these difficulties and get our quartz uniformly and highly heated throughout so that all surfaces of quartz become evaporating surfaces by applying a metallic coating which absorbs radiant heat, which conducts heat around the particles, and which gives a superficial molten phase which increases the heating also through better thermal contact. We can thus rapidly evaporate relatively large quantities of quartz in a short time and uniformly in all directions.

The application of a high degree of heat to the coil or filament 20 as shown in Figure 6 will now cause the uniform thermal evaporation of the quartz and the particles or molecules thereof will be dispersed and deposited upon the reflective face or surface of the mirror or reflector 27 located within the apparatus to produce on said reflective surface a protective coating or layer of quartz which is uniform and relatively thick. The finished product or article produced by our improved method within the housing 22 is best seen in Figure 9 of the drawings. In this figure, the mirror or reflector, shown as a whole at 27, has a backing 31, preferably formed from glass, a reflective or mirrored surface 32, and a relatively thick and uniform protective surface coating or layer 33 of quartz. It is to be noted that the protective quartz coating is relatively thick and uniform, being shown as approximately twice the thickness of the reflective coating or layer 32.

It will be understood that the precoating of the quartz with a suitable metal, several of which have been mentioned above, may be performed within the apparatus shown in Figure 1 while the chamber of that apparatus is subjected to a relatively high vacuum after the air has been completely evacuated therefrom.

By way of further examples of how our new process of evaporating quartz may be carried out, we set up a bell jar or the like 45 containing several electrically heated tungsten resistance coils 20 and 20a as shown in Figure 10. On some of these, uncoated quartz rods 180 were placed which weighed a total of 4½ grams comprising 1.70 cc. On other tungsten heater coils, there were placed pieces of beryllium 46 weighing 2.2 grams of a total volume of 0.815 cc. One or more clean glass plates 127 were set up in the bell jar at a distance of 24 inches from the heater wires 20, 20a and the bell jar 45 was then evacuated by a pump (not shown) to a very high vacuum of the order of 10 to the minus 5 millimeters. The coils or wires 20a carrying the beryllium pieces 46 were then energized and heated by passing an electric current through them sufficient to cause the beryllium to melt and evaporate. There was thrown onto the glass 31 as shown in Figure 9 after all the beryllium was evaporated a deposit or layer 32 of 0.044 gram of beryllium per square foot of glass surface. Beryllium also deposited on the quartz in the adjacent heater wires 20 which had not been heated. Thus our quartz was secured in the desired metallic coated condition. The coils 20 carrying the coated quartz were next energized with electric current and raised to a high heat. The quartz was found to evaporate readily and not to jitter around, and the quartz was found to deposit on top of the beryllium coated glass in a uniform coating 33 of 0.090 gram per square foot. As the evaporation was completed, the heater wire current was turned off and the vacuum released. It was found that we had produced a beryllium mirror 27 approximating that shown at 27 in Figure 9, in which the beryllium layer was approximately 0.000175 millimeter thick. On top of this beryllium layer of Figure 9 and protecting the same was the protecting quartz layer 33 having a thickness of 0.000350 millimeter.

Figures 11, 12:
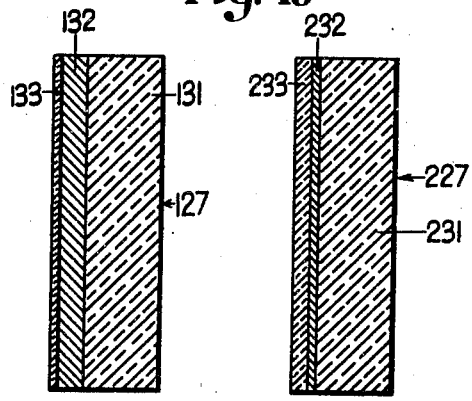
Figure 11 is an edge view of another mirror, reflector, or the like produced in accordance with our invention.
Figure 12 is a view similar to Figure 11 showing a further modified form of mirror, reflector, or the like, produced in accordance with the present invention.

Proceeding as in the above example, and in accordance with the disclosure in Figure 10, we first evaporated 2.2 grams of beryllium and thereafter evaporated the coated quartz produced. The amount of quartz originally taken weighed 0.45 gram. In this case our quartz coating 133 on the beryllium mirror 127 produced was one-fifth the thickness of the beryllium deposit 132, as indicated in Figure 11. In general, we may follow in direct sequence evaporation of a preferred metal, such as beryllium, from a hot surface in a vacuum and thereafter evaporate the quartz in the same vacuum since it has become coated with the heat-absorbing metal and is in a condition for the evaporation when heat is applied to it.

In a bell jar having several electrically heated resistance coils, such as shown in Figure 10, there was placed on some of these coils 0.75 gram of silver which is 0.071 cc. in volume. In other coils there were placed pieces of quartz rod which had been precoated with beryllium by a preliminary evaporative step as illustrated in Figures 1 to 3. The amount of coated quartz taken was 0.57 gram. One or more glass sheets 227 (Figure 12) to be coated were placed in the vacuum chamber 45 twelve inches away from the evaporation sources or heater wires 20 and 20a and the pressure was reduced to 0.00001 millimeter. By applying current to the heater wires 20a carrying the silver, this was evaporated and gave on the glass a deposit or layer 232 which was a fine mirror and which was 0.000060 millimeter thick. The quartz was next evaporated onto this by energizing the electric coils 20 and gave a protective coating 233 on top of the silver 232 three times as thick as the silver layer 232, as seen in Figure 12.

Referring now to Figure 7 of the drawings, we have shown therein a modification of the improved means, method or process embodying the present invention. In accordance with this form of our invention and in lieu of the precoating of the quartz as described above, we preferably provide a piece, such as a stick or round bar 40 of quartz, with a wrapping of relatively thin wire 41 formed from suitable metal, such as beryllium, titanium, or zinc. The convolutions of the wire 41 are, as shown, placed relatively close together so that when the wire-wrapped piece of quartz 40 is placed within the coiled filament 20, described above, the quartz, that is substantially all of the surfaces thereof, will be in actual surface contact with the coiled filament 20 through the medium of the wrapping wire 41. A wetting of the filament 20 by the quartz on heating by energizing the filament 20 is developed by the metals forming wire 41 and the heat waves from the filament will travel in the directions indicated by the arrows 29 and 30, shown in Figure 6 to transmit heat to all portions or surfaces of the quartz. As in the preceding embodiment of our invention, the quartz 40 will assume, at least on its surface, a superficial molten phase and will thus, in effect wet the filament 20. The temperature of the filament 20 may now be maintained to effect the deposition, by thermal evaporation, of particles or molecules of the quartz piece or stick 40 on the adjacent face or mirrored surface of the mirror or reflector 27 located within the housing 22.

From the foregoing it will be seen that we have provided means or a method of evaporating quartz by either precoating the quartz with some suitable metal to aid in the wetting of an energized filament, such as a tungsten filament, or by applying a wrapping of a suitable thin metal wire to the quartz prior to the wetting of the filament, and thereafter effecting the uniform evaporation and control of the quartz to produce, by deposition, a protective coating or layer of quartz on the face or surface of a reflective article such as a mirror or reflector. In both cases, the quartz has actual physical contact with the hot filament through the medium of the metallic coating or the wound wire on the surface of the quartz. It will be seen, too, that we have also provided a new article of manufacture, such as an improved mirror or reflector whose reflective surface or face is protected from scratching, marring, or other damage which would impair its usefulness, by the application thereto of an extremely hard and relatively thick and uniform layer or coating of quartz.

Having thus described the invention, what is claimed is:

1. The method of coating a surface with quartz by evaporation technique within a vacuum, comprising contacting substantially the entire surface of the quartz with beryllium, positioning the quartz and attached beryllium within an electrically heated filament in a high vacuum to heat the quartz to a high temperature and to evaporate said quartz, and depositing the quartz on a support surface, said beryllium having a melting point lower than the temperature to which the quartz is heated to effect its evaporation.

2. The method of coating a reflective mirror surface with quartz by evaporation technique within a vacuum, comprising contacting substantially the entire surface of the quartz with beryllium, positioning the quartz and attached beryllium within an electrically heated filament in a high vacuum to heat the quartz to a high temperature and to evaporate said quartz, and depositing the quartz on a reflective mirror surface, said beryllium having a melting point lower than the temperature to which the quartz is heated to effect its evaporation.

3. A method according to claim 1, wherein the temperature is raised above 1500° C.

4. The method of coating a surface with quartz by evaporation technique within a vacuum, comprising positioning the quartz within an unheated metal filament located within a vacuum, thermally evaporating beryllium to deposit it on the surface of said quartz, electrically heating the metal filament to radiate heat to the beryllium covering the quartz to heat said quartz to a high temperature and to evaporate the latter, and depositing the quartz on a support surface, said beryllium having a melting point lower than the temperature to which the quartz is heated to effect its evaporation.

5. The method of coating surfaces with quartz by evaporation technique within a vacuum, comprising the steps of winding a beryllium wire around a piece of quartz, applying the wire-wound quartz to an electrically heated filament and causing the quartz to directly contact the filament by energizing and thus heating the filament, and thereafter increasing the temperature of the filament while subjecting the mirrored surface of an article to said filament, to effect, by thermal evaporation, the deposition of a coating of quartz upon the mirrored surface to protect said surface.

JAMES C. OGLE, JR.
ARTHUR R. WEINRICH.

REFERENCES CITED

The following references are of record in the file of this patent:

UNITED STATES PATENTS

| Number | Name | Date |
| --- | --- | --- |
| 2,386,876 | Ogle, Jr., et al. | Oct. 16, 1945 |
| 2,413,606 | Colbert et al. | Dec. 31, 1946 |